(12) United States Patent
Bowra et al.

(10) Patent No.: US 7,802,006 B2
(45) Date of Patent: Sep. 21, 2010

(54) MULTI-LOCATION BUFFERING OF STREAMING MEDIA DATA

(75) Inventors: Todd Bowra, Redmond, WA (US); Ashley C Speicher, Redmond, WA (US); Nicholas J Fang, Redmond, WA (US); Sudhakar V Prabhu, Bellevue, WA (US); David M Davis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 11/762,090

(22) Filed: Jun. 13, 2007

(65) Prior Publication Data

US 2008/0310814 A1 Dec. 18, 2008

(51) Int. Cl.
*G06F 15/16* (2006.01)
(52) U.S. Cl. ..................................... 709/231
(58) Field of Classification Search .............. 709/231; 718/103; 710/56; 711/114, 158
See application file for complete search history.

(56) References Cited

U.S. PATENT DOCUMENTS

| | | | | |
|---|---|---|---|---|
| 6,438,630 | B1 * | 8/2002 | DeMoney | 710/56 |
| 6,463,508 | B1 | 10/2002 | Wolf et al. | |
| 6,868,439 | B2 | 3/2005 | Basu et al. | |
| 6,986,018 | B2 | 1/2006 | O'Rourke et al. | |
| 7,197,570 | B2 | 3/2007 | Eylon et al. | |
| 7,266,288 | B2 * | 9/2007 | Tsurui et al. | 386/68 |
| 2004/0249969 | A1 * | 12/2004 | Price | 709/231 |
| 2005/0004997 | A1 | 1/2005 | Balcisoy et al. | |
| 2005/0193017 | A1 * | 9/2005 | Kim | 707/104.1 |
| 2006/0080724 | A1 | 4/2006 | Vermeiren et al. | |
| 2006/0136457 | A1 | 6/2006 | Park et al. | |
| 2006/0168227 | A1 | 7/2006 | Levine et al. | |
| 2007/0038773 | A1 | 2/2007 | White et al. | |

FOREIGN PATENT DOCUMENTS

WO WO2007028137 A2 3/2007

OTHER PUBLICATIONS

Hardin, et al., "VOD Servers—Equations and Solutions", Dec. 1, 2005, pp. 1-11.
McNamee, et al., "Synthetic Files: Enabling Low-latency File I/O for QoS-Adaptive Applications", available at least as early as Apr. 2, 2007 at <<http://web.cecs.pdx.edu/~walpole/papers/ogicse9812.pdf>>, pp. 1-10.
Revel, et al., "Feedback-based Dynamic Proportion Allocation for Disk I/O", Dec. 7, 1998, pp. 1-5.
Wenisch, et al., "SORDS: Just-In-Time Streaming of Temporally-Correlated Shared Data", Computer Architecture Lab at Carnegie Mellon (CALCM) Technical Report, 2004, pp. 1-10.

* cited by examiner

*Primary Examiner*—Frantz B Jean
(74) *Attorney, Agent, or Firm*—Alleman Hall McCoy Russell & Tuttle LLP

(57) ABSTRACT

The multi-location buffering of streaming media data is disclosed. One embodiment comprises buffering a first segment of media data associated with a current playback location, and buffering a second segment of media data associated with a seek point separated from the first segment of media data by a segment of unbuffered data. In this manner, data at seek points in the media stream may be buffered before a user requests a seek operation. Playback at a seek point may therefore begin with lessened or no perceived lag when a user inputs a seek command.

20 Claims, 5 Drawing Sheets

MULTI-LOCATION BUFFERING OF STREAMING MEDIA DATA

BACKGROUND

In a client-server streaming media environment, a media server streams media data to a client media receiver for playback. In such an environment, the client media receiver may buffer only a few seconds worth of media samples before playback, discarding those samples once playback has occurred.

Some media receivers may have operating modes other than normal speed playback ("1× playback"). One common operation is a seek operation, in which a user may request the current playback position within the media stream to jump ahead or behind a current playback location to other locations in the media stream. As a specific example, a media receiver receiving movie data from a digital video disc (DVD) player may allow a user to jump between start points of chapters or scenes in the movie. Likewise, a media receiver receiving media data from a digital video recorder (DVR) may allow a user to jump a set number of seconds forward or backward within a media data stream.

During such seek operations, a media receiver may flush currently buffered data and request new media samples from the server for the new playback position. However, the request and receipt of the new media samples may take some time due to network latency, which may be perceived by a viewer as a pause before playback begins at the requested seek point.

Some streaming technologies have attempted to overcome such latency by using a form of streaming called "progressive download" in which an entire media stream is downloaded and stored local to the media receiver. However, such methods may not be suitable for use on media receivers with limited local storage. Further, such methods only improve performance at seek points if the media stream has been buffered past the requested seek point.

SUMMARY

Accordingly, the client-side buffering of data in a streaming media environment is described below in the Detailed Description. For example, one disclosed embodiment comprises buffering a first segment of media data associated with a current playback location, and buffering a second segment of media data associated with a seek point separated from the first segment of media data for at least a duration by a segment of unbuffered data. In this manner, data at seek points in the media stream may be buffered before a user requests a seek operation. Playback at a seek point may therefore begin with reduced or no lag when a user inputs a seek command.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
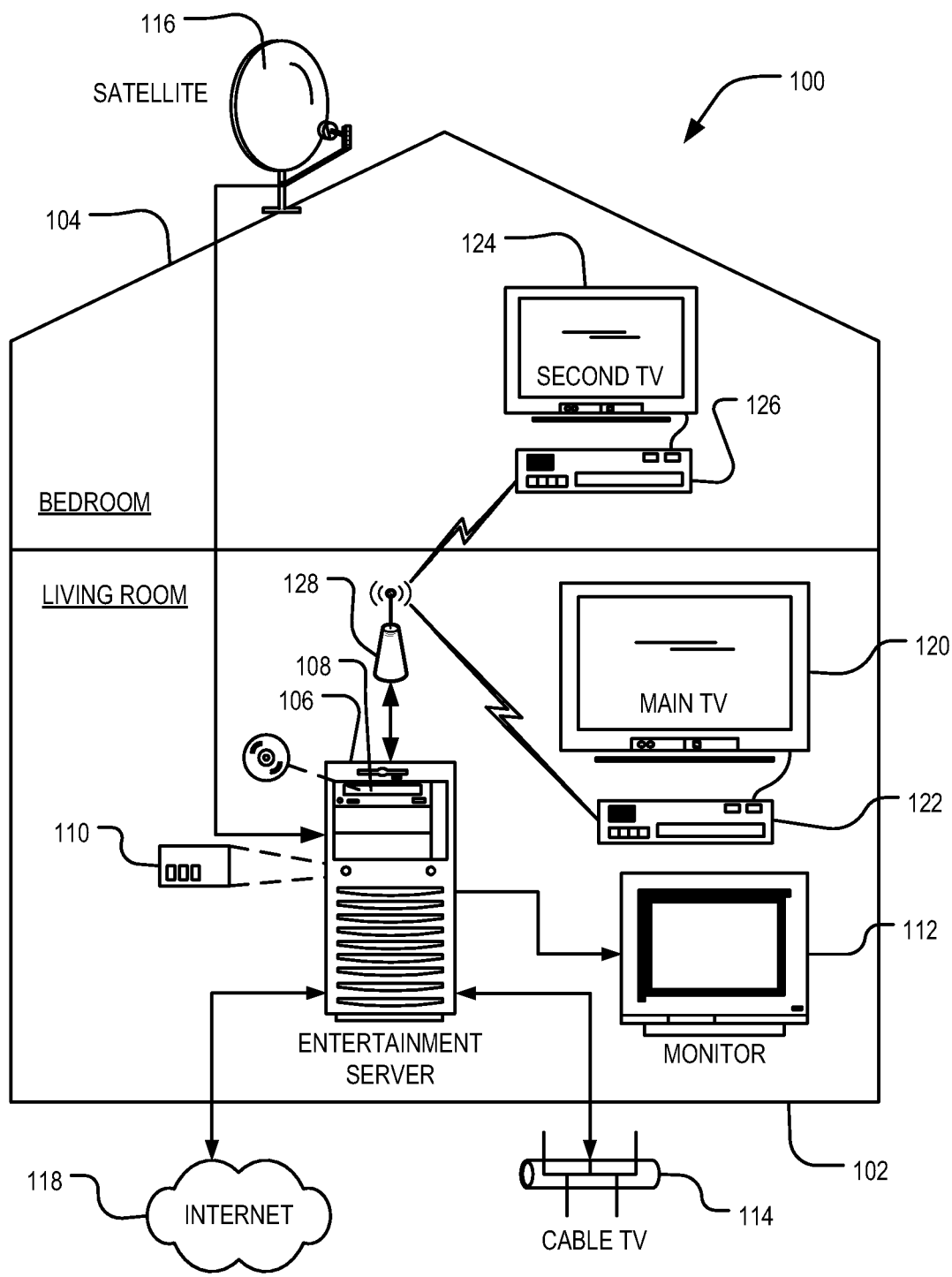
FIG. 1 shows an example of an embodiment of a home media environment.

Prior to discussing the client-side buffering of streaming media data, one example of a streaming media use environment is described. FIG. 1 depicts an example home entertainment environment 100 including a living room 102 and a bedroom 104. Central to the home entertainment environment 100 is a media server 106, in this implementation situated in the living room 102, but which could be located anywhere within the house. In one implementation, the media server 106 is a conventional personal computer (PC) configured to run a multimedia software package, for example, the Windows Vista Ultimate operating system with Windows Media Center (available from Microsoft Corporation of Redmond, Wash.). In such a configuration, the media server 106 is able to integrate full computing functionality with a complete home entertainment system into a single PC. For example, a user can watch television (TV) in one graphical window of a video monitor, while sending e-mail or working on a spreadsheet in another graphical window on the same monitor. In addition, the media server 106 may also include other features or components, for example: a digital video recorder (DVR) to capture live TV shows for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, and home videos; and an electronic program guide (EPG) (not shown in FIG. 1).

Instead of a conventional PC, the media server 106 may comprise a variety of other devices capable of storing and distributing media content including, for example, a notebook or portable computer, a tablet PC, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full function computer running an operating system, the user may also have the option to run standard computer programs (e.g., word processing and spreadsheets), send and receive e-mails, browse the Internet, or perform other common functions.

In addition to storing media content, the media server 106 may be connected with a variety of media sources, for example, a cable connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, or antenna. This capability is enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of content. Alternately, the user may employ an SD tuner for SD content and an HD tuner for HD content separately.

The TV content may be received as an analog (i.e., radio frequency) signal or a digital signal (e.g., digital cable). The received TV content may include discrete content packets, where each content packet includes actual TV content (i.e., audio and video data) and a policy or policies associated with the actual TV content. If TV content is received as an analog signal, discrete content packets may be created from the analog signal.

The home environment 100 may also include one or more network devices functioning as media receivers 122, 126 placed in communication with the media server 106 through a network 128, for example, a local area network (LAN). In an example embodiment, each media receiver 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), or combinations thereof. Furthermore, the media receivers 122, 126 may include a tuner as described above.

The network 128 may comprise a wired and/or wireless network, for example, cable, Ethernet, WiFi, a wireless access point (WAP), or any other electronic coupling means, including the Internet. The network 128 may enable communication between the media server 106, the media receivers 122, 126, and any other connected device through packet-based communication protocols, such as Transmission Control Protocol (TCP), Internet Protocol (IP), Real-time Transport Protocol (RTP), Real-time Transport Control Protocol (RTCP), and User Datagram Protocol (UDP). Communications may be transmitted directly between devices over a LAN, or they may be carried over a wide area network (WAN), for example, the Internet 118.

One or more video display devices, for example a main TV 120 in the living room 102, a secondary TV 124 in the bedroom 104, and a video monitor 112 may be situated throughout the home environment 100. These video display devices may be connected with the media server 106 via the network 128 either directly or via the media receivers 122, 126. As shown in the example of FIG. 1, the main TV 120 and the secondary TV 124 may be coupled to the media receivers 122, 126 through conventional cables. The video monitor 112 may be coupled with the media server 106 directly via a video cable. The media server 106 and media receivers 122, 126 may also or alternatively be coupled with any of a variety of video and audio presentation devices. Media content including TV content may thus be supplied to each of the video display devices 112, 120, 124 over the home network 128 from the media server 106 situated in the living room 104.

The media receivers 122, 126 may be configured to receive streamed media content, including video and TV content, from the media server 106. Media content, and particularly video and TV content, may be transmitted from the media server 106 to the media receivers 122, 126 as streaming media comprised of discrete content packets via any of the network protocols described above. The streamed media content may comprise IPTV (television content delivered over the Internet) Standard Definition (SD), and High Definition (HD) content, including video, audio, and image files, decoded on the media receivers 122, 126 for presentation on the connected TVs 120, 124. The media content may further be "mixed" with additional content, for example, an EPG, presentation content related to the media content, a web browser window, and other user interface elements transmitted from the media server for output on the TVs 120, 124 or the monitor 112. Such additional media content may be delivered in a variety of formats, for example, as Hypertext Markup Language (HTML) documents, using various protocols, including but not limited to standard Remote Desktop Protocol (RDP).

Media receivers 122, 126 may be configured not only to play media streams at 1× (i.e. normal playback operation), but also to operate in trick modes, such as fast-forward, rewind, and seek modes. As described above, some media receivers may be configured to flush currently buffered data and request new data samples when a seek operation is requested. Such media receivers may have a noticeable lag before playback begins at the seek point due to the time required to receive and decode the requested data samples. Progressive downloading of an entire media stream may help to solve such latency problems to the extent that the media data at the requested seek point has already been downloaded. However, the progressive downloading of an entire media stream may be impracticable where the media stream is too large to buffer in its entirety, or where live streams are downloaded and the entire content is not available even if space is available on the device. Additionally, progressive downloading mitigates lag only where the media stream has been buffered past and retained at the requested seek. Therefore, if seeks are requested that fall outside of the currently buffered data, lag may still occur.

To prevent latency at seek points in the media stream, media receivers 122, 126 may be configured to buffer media data associated with one or more seek points before the progressive buffering of data at a current playback location reaches those seek points. Likewise, if the buffer for the media stream is too small to store the entire media stream, media receivers 122, 126 could also be configured to selectively retain buffered media data after playback of the media data such that data is retained in the vicinity of backward seek points, while flushing other data when appropriate. In this manner, playback may begin immediately at a seek point, with less or no noticeable lag, thereby providing a more satisfying user experience. The term "data associated with" as used herein signifies data that allows playback at a seek point to begin without having to first buffer and decode the data. Additionally, media receivers 122, 126 may also be configured to anticipate context by monitoring past user behavior, and to modify the buffering of media data streams in a predictive manner based upon one or more characteristics of the past user behavior.

Prior to discussing these embodiments in detail, it will be appreciated that the methods described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program. Likewise, the terms "computer" and "computing device" as used herein include any device that electronically executes one or more programs, including but not limited to media server 106, media receivers 122, 126, and any other suitable device such as personal computers, servers, laptop computers, hand-held devices, cellular phones, microprocessor-based programmable consumer electronics and/or appliances, routers, gateways, hubs and other computer networking devices. Such computing devices may be located on a user's local network and/or on any other local and/or wide area networks, including but not limited to the Internet.

Figure 2:
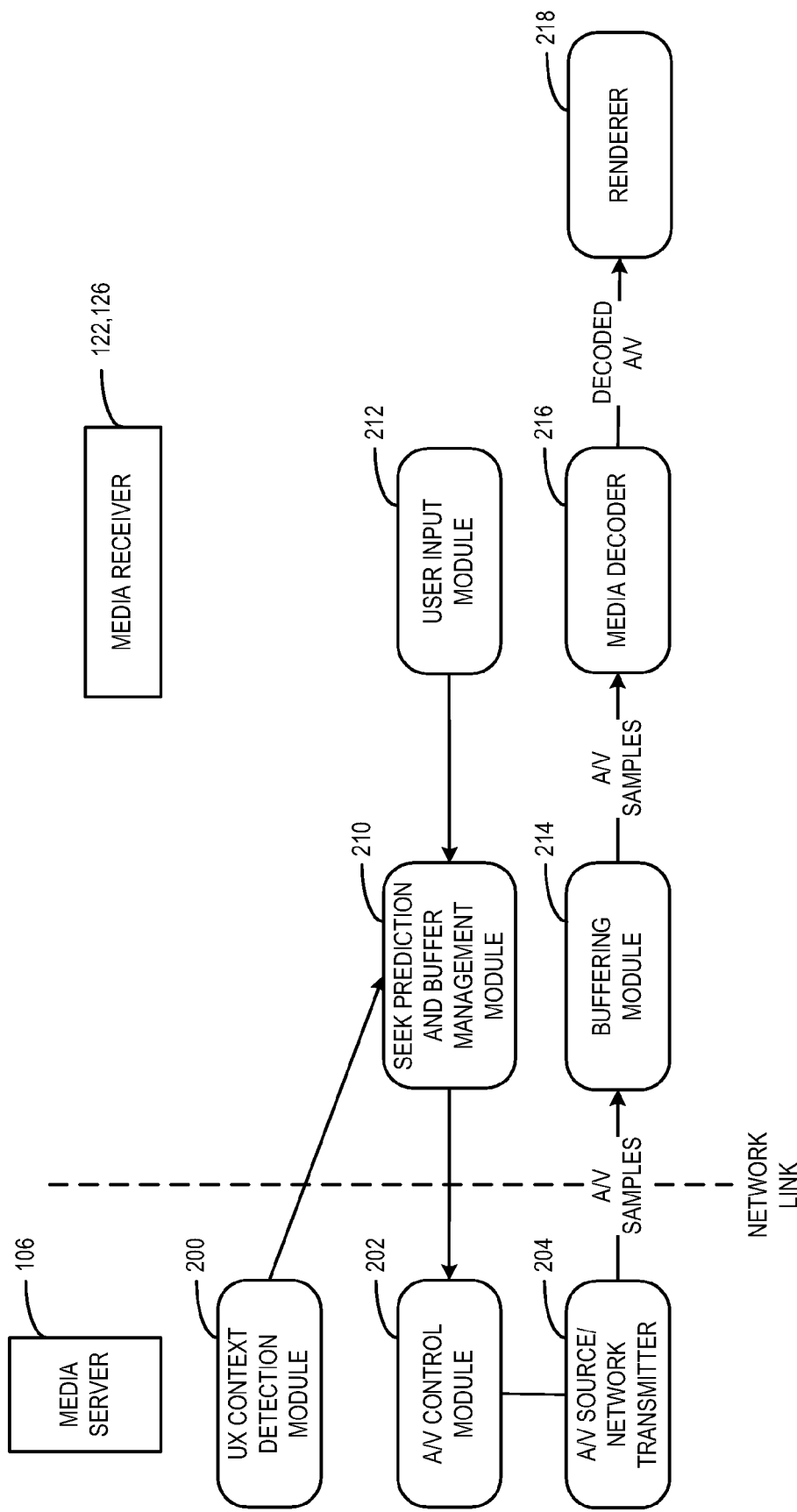
FIG. 2 shows a block diagram of a media server and a media receiver of the embodiment of FIG. 1.

FIG. 2 is a block diagram showing an embodiment of media server 106 and an embodiment of one of media receivers 122, 126, and illustrates various functional components of these devices related to client-side media stream buffering. First, media server 106 comprises a UX context detection module 200. The UX context detection module 200 determines a type of content being played or to be played (for example, TV show, movie, etc.), and transmits that information to the media receiver 122, 126 that is playing the content. The UX context detection module 200 also may transmit the time location of any seek points, such as chapter markers, present in the content being played.

Media server 106 also comprises an A/V control module 202 and an A/V source/network transmitter 204. The A/V control module 202 is configured to receive requests from media receivers 122, 126 for streaming media data, and to instruct the A/V source/network transmitter to transmit the requested media data to the requesting media receiver 122, 126.

Continuing with FIG. 2, each media receiver 122, 126 includes a seek prediction and buffer management module 210, a user input module 212, a buffering module 214, a media decoder 216, and a renderer 218. The user input module 212 allows users to input commands related to the selection and playback of media. The buffering module 214 receives media samples from the media server 106 and buffers them for playback. The media decoder 216 decodes media samples for the current playback position before passing decoded A/V information to the renderer 218 for presentation.

The seek prediction and buffer management module 210 manages the buffering of media data at a current playback location, and also uses additional available network bandwidth to manage the buffering of data at one or more forward and/or backward seek points. Further, the seek prediction and buffer management module 210 may gather statistics covering past user seek behavior, and may use this information to predict likely seek points which the user may request. The seek prediction and buffer management module 210 may additionally use media context/type information and past user behavior information to determine which data to flush from buffering module 214 and when to flush it, if data is to be cleared from the buffering module 214. While shown in FIG. 2 as being located on the client media receiver devices 122, 126, it will be appreciated that the seek prediction and buffer management module 210 may also be located on the media server 106, and/or may be distributed between the devices.

Additionally, the seek prediction and buffer management module 210 may determine an amount of bandwidth available for streaming data to media receiver 122, 126. This information may be used to manage the buffering of data, for example, by apportioning the available bandwidth between downloading media data associated with a current playback position and media data associated with a predicted seek point, and/or by changing a bit rate of the media stream to accommodate the desired buffering. Information regarding the available bandwidth of the connection of media server 106 to media receivers 122, 126 may be determined in any manner, or may be received from media server 106 or other network device.

The seek prediction and buffer management module 210 may use any suitable method or methods to predict the seek points at which to buffer data. For example, information received from the UX context detection module 200 on the media server 106 may be used to identify the location of chapter headings or other seek points at which a predetermined amount of media data is to be buffered. The location of the seek points may vary depending upon the type of media data being played. In the case of a DVD movie source, the time location of chapter headings and/or scene beginnings may be predefined at fixed locations in the media file. In contrast, in the case of TV signals and the like, media server 106 may respond to seek requests by skipping a fixed number of seconds ahead or behind a current playback location. In this context, the seek points are located at fixed intervals from a current playback location, rather than at fixed time locations within the media file.

In either case, the seek prediction and buffer management module 210 may, while buffering data associated with the current playback position, also request media data associated with one or more predicted seek points and then buffer the data so that a user experiences less or no lag upon making a seek command. As a specific example, in one embodiment, the seek prediction and buffer management module 210 may be configured to control the buffering of a few seconds of media data at a next forward seek point, in addition to maintaining a sufficient buffer of media data at the current playback location. As another specific example, the seek prediction and buffer management module 210 may be configured to control the buffering of a few seconds of media data at three nearest forward seek points, in addition to maintaining a sufficient buffer of media data at the current playback location. It will be appreciated that these specific embodiments are described only for the purpose of example, and are not intended to be limiting in any sense. Other specific illustrative examples are described in more detail below.

As mentioned above, the seek prediction and buffer management module 210 may also use statistics regarding past user behavior to determine those seek points in the media stream that users are likely to request, and to control or adjust the buffering of data at these locations. Any suitable statistics regarding past usage may be tracked, and such statistics may be used in any suitable manner to determine or adjust the buffering of media data. Statistics that may be tracked include, but are not limited to, information regarding how long users typically wait between seek requests, how many seeks ahead or behind a current playback position a user typically requests, how long users play from each seek point before requesting a new seek, how frequently users typically request forward seeks and backward seeks, and other such statistical data related to the frequency and pattern of seek operations requested.

Likewise, the seek prediction and buffer management module 210 may make any suitable adjustment to the buffering of data based upon such tracked statistics. For example, where the seek prediction and buffer management module 210 tracks how long users play from each seek point before requesting a new seek, the seek prediction and buffer management module 210 may adjust the quantity of data buffered at each seek point based upon the length of this interval between successive seeks, for example, by buffering an amount of data approximately equal to an average no-seek interval length. Likewise, if the tracked statistics show that the seek command is never used, the seek prediction and buffer management module 210 may cease buffering data at seek points, and only buffer data at the current playback location. Other examples of adjustments that may be made to the buffering of data based upon tracked user statistics are discussed in more detail below.

The statistics used for adjusting the buffering of streaming data may be refreshed each time media receiver 122, 126 is powered up, or may be tracked and stored across multiple usage sessions. Where the statistics are tracked and stored across multiple usage sessions, the buffering adjustments made due to the statistics may be made globally (i.e. for all users and/or all media content items), or may be stored in profiles related to specific users and/or groups of related media content items. The use of profiles specific to users and/or shows may allow media receivers 122, 126 to predict the seek behavior of multiple users and to buffer data in a manner specific to each user. The use of user profiles may require each user to complete a login or other identification session before beginning a viewing session. In contrast, because different people in a single use environment, for example, different members of a family in a single household, may watch different shows, the storage of seek statistics in profiles for different shows may allow the seek behavior of individual users to be indirectly tracked without the use of a login or other unique user identification information. Further, predetermined user usage profiles (such as 'requests many seeks', 'skips commercials', etc.) that are associated with predetermined buffering patterns may be presented to users for selection from a context menu to avoid privacy concerns over saving user information in profiles.

The seek prediction and buffer management module 210 and/or the A/V control module 202 may also be configured to create capacity for buffering media data at seek points where the network capacity is otherwise too low. For example, if the seek history suggests that the user actively uses seek, but there isn't excess network capacity available to allow buffering at predicted seek points, the seek prediction and buffer management module 210 and/or the A/V control module 202 may decide to transrate the media data stream to reduce the bit rate of the stream and free up network capacity to be used for buffering at seek points. In this situation, buffer management module 210 may direct another module on media server 106 to transrate the data prior to transmission.

As mentioned above, in cases where the media receiver does not have sufficient local storage to buffer an entire media data stream, or otherwise does not want to buffer the entire stream, the seek prediction and buffer management module 210 may also be configured to determine which media samples to flush and when to flush the samples. As with the forward seek points, already-played samples in the buffer may be flushed in a manner that retains at least some media data samples at one or more backward seek points so that a user doing a backward seek (i.e. a seek to an earlier point in a media stream) perceives less or no lag before playback begins at the new seek point.

Data may be retained at past seek points in any suitable manner. For example, in one embodiment, media data samples are not flushed until they are at least one seek point into the past. As a more specific example, if the playback system performs a backward seek by jumping 7 seconds backwards, the last 7 seconds of media samples may be retained in the buffer (i.e. for every second of content played, one second worth of data starting from 8 seconds earlier is flushed). In another embodiment, at least some media data samples are retained at a plurality of past seek points, while some data between the seek points is flushed. It will be appreciated that these specific embodiments are described for the purpose of example, and are not intended to be limiting in any sense.

Figure 3:
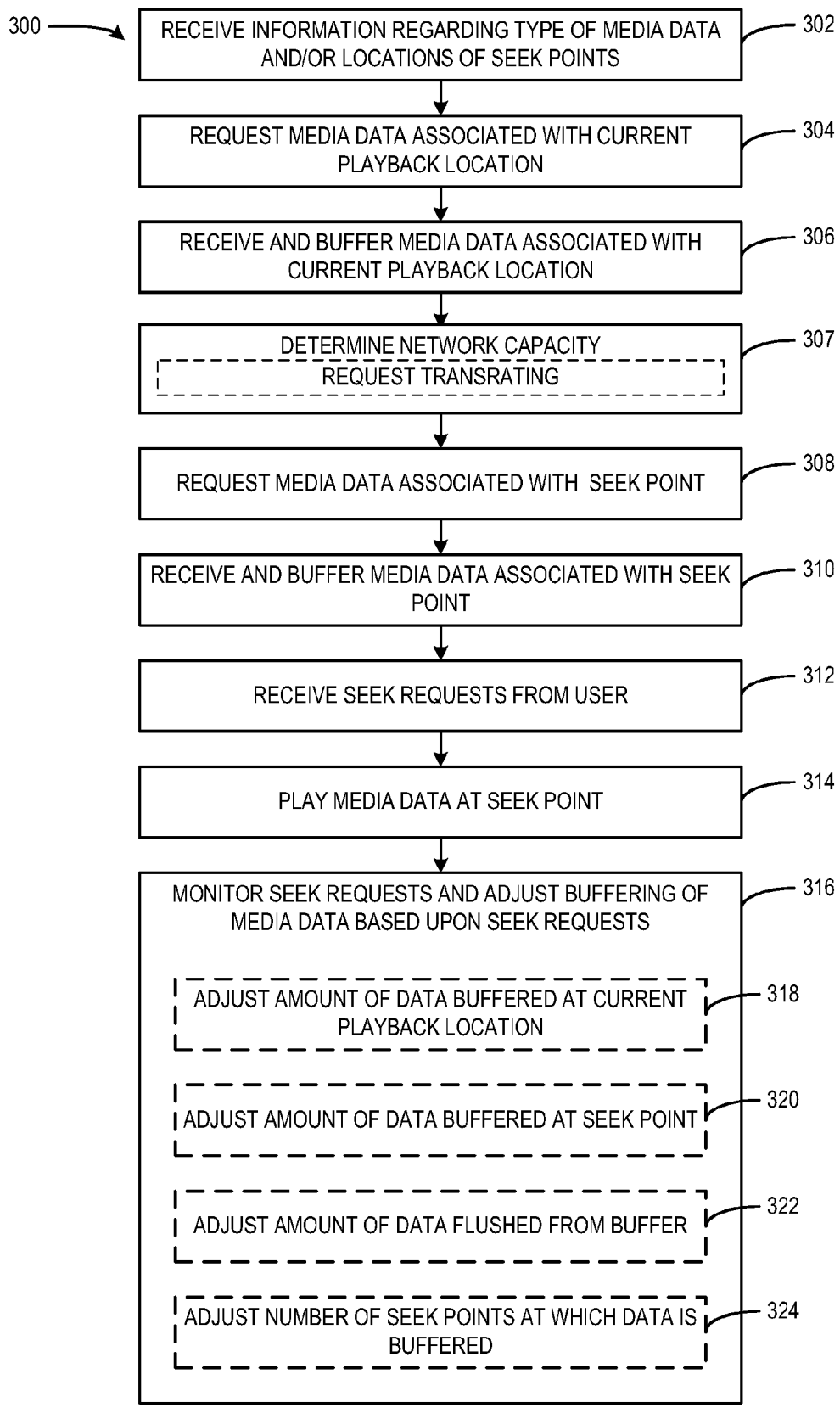
FIG. 3 shows a process flow depicting an embodiment of a method of buffering streaming media data.

FIG. 3 shows a process flow depicting an embodiment of a method 300 of performing client-side buffering in a streaming media environment. Method 300 may be performed on media receivers 122, 126, and/or on any other suitable device that receives streaming media, and is generally performed after a media stream has been requested by a streaming media receiver. It will be appreciated that the steps need not be performed in the depicted order, and also that one or more steps of method 300 may be omitted in some embodiments.

Method 300 first comprises (at 302) receiving information regarding a type of media data and/or locations of seek points within the media data that is being streamed to the receiver. Next, method 300 comprises requesting media data associated with a current playback location (at 304), receiving and buffering the data associated with the current playback location (at 306), optionally determining the network capacity and optionally requesting the transrating of the data stream (at 307), requesting media data associated with a seek point (at 308), and receiving and buffering media associated with a seek point (at 310). Method 300 next includes receiving a seek request (at 312), and then playing the buffered data at the seek point (at 314). Method 300 may further include monitoring users' seek requests, and predictively adjusting the buffering of media data based upon one or more characteristics of the seek requests (at 316). Each of these steps is described in more detail below.

First, any suitable information regarding the type of media data and/or the locations of seek points in the media data may be received at 302. For example, the information may specify whether the media data is movie data, television data, or other audio/visual data. Likewise, the information may specify the locations of one or more seek points in the media data. From this data, seek prediction and buffer management module 210 may then predict the location of seek points at which data is to be buffered.

Next, the requesting and buffering of the media data associated with the current playback location and predicted seek points at 304-310 may likewise be performed in any suitable manner. Generally, sufficient data associated with the current playback position is buffered to ensure that playback of the data occurs in such a manner as to avoid device starvations that may be perceived as glitches during playback. Likewise, data at one or more predicted seek points is buffered in such a manner as to attempt to allow a viewer to jump between seek points with little to no noticeable latency at each skip point. This may involve buffering media data at one or more predicted forward seek points before the buffered data associated with the current playback location reaches these seek points, such that a segment of unbuffered media data exists at least temporarily between the data associated with the current playback location and the data associated with the seek point. Doing so may allow playback following seek operations to occur with less or no perceived lag.

Further, as shown at 307, the requesting and buffering of data associated with the current playback location and the predicted seek point may comprise determining an amount of network capacity available for the buffering operation. Additionally, if the current network capacity is too low to accomplish the desired buffering in the desired timeframe, this operation may also comprise requesting the media server 106 to transrate the data stream to free up network capacity. Alternatively, the determination of network capacity may be performed by media server 106 prior to sending the requested data.

Continuing with FIG. 3, any suitable statistics regarding past seek behavior may be monitored at 316. Examples include, but are not limited to, the number of seek requests made, the frequency at which seek requests are made, the direction (forward or backward) of each seek request made, an amount of time users remain at a seek point before requesting another seek, etc. Furthermore, this statistical information may be stored in user or content profiles, may be refreshed each time the receiver is powered up, or may be stored in any other suitable manner. Likewise, the statistical information may be stored in any suitable location, including but not limited to on media server 106, media receivers 122, 126, and/or on a device connected to one or more of these devices via a local area network and/or a wide area network such as the Internet. Additionally, statistical information related to other trick-mode use, such as rewind or fast forward use, may also be stored and tracked for use in predictively adjusting buffering behavior.

Likewise, the buffering of data associated with the current playback location and data associated with the seek point may be adjusted based upon these statistics in any suitable manner. Some specific examples of adjustments to buffering that may be made include adjusting the amount of data buffered at a current playback location, adjusting the amount of data buffered at one or more seek points, adjusting the amount of and/or location of data flushed from the buffer, and adjusting the number of seek points at which data is buffered.

FIGS. 4-13 show other illustrative examples of various ways in which streaming media data may be buffered depending upon past seek behavior. FIGS. 4-9 are shown in the context of data having seek points fixed in time in the media stream (e.g. chapter/scene start locations in a stream of movie data), while FIGS. 10-13 are shown in the context of data having seek points located at fixed intervals from a current playback location (e.g. as may be used with streaming of prerecorded television data).

Figure 4:
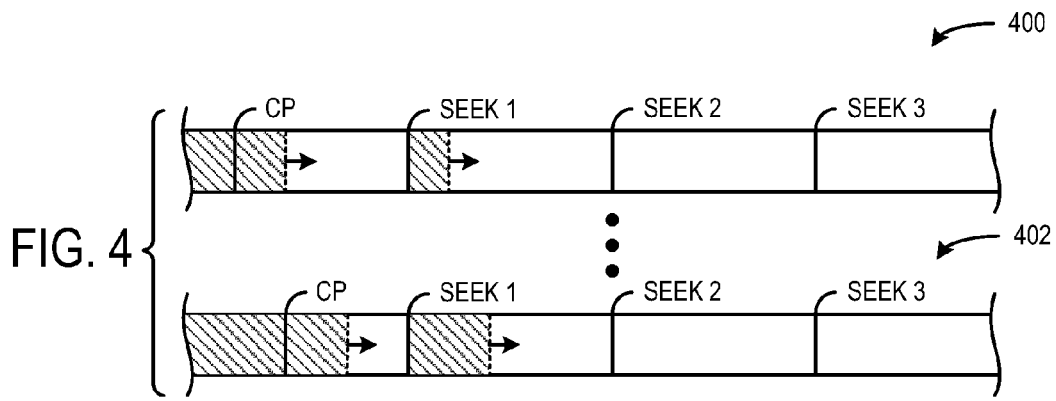
FIG. 4 shows a schematic depiction of an embodiment of a buffer containing streaming media data at first and second points in time.

First regarding FIGS. 4-9, FIG. 4 shows a schematic depiction of a buffer containing a segment of buffered data associated with a current playback location ("CP") and with one forward seek point ("SEEK 1"). FIG. 4 also illustrates the accumulation of data in this buffer over a period of time. As shown at 400 the segments of buffered data are separated by a segment of unbuffered data. As shown at 402, as time progresses, the amount of data buffered at the seek point may increase until a desired amount is reached. With this data buffered, a user may be able to skip to this seek point in the media stream without perceiving any lag before playback begins at the seek point. Once the current playback position reaches this seek point, data may be buffered at the second seek point ("SEEK 2"). Alternatively, data can be buffered at the second seek point before the current playback position reaches the first seek point, or concurrently with the buffering of data at the first seek point.

The buffering process depicted in FIG. 4 may be a default method (i.e. the buffering used in the absence of any predictive or adaptive adjustment), or may represent a modification of a default process based upon past seek behavior statistics. For the purpose of describing FIGS. 5-7, it will be assumed that the buffering shown in FIG. 4 is a default method, and that the buffering shown in FIGS. 5-7 represent modifications to the default method based upon prior user seek behavior.

Figure 5:
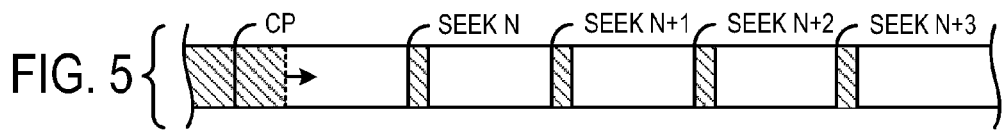
FIG. 5 shows a schematic depiction of an example of an adjustment of the buffering of streaming media data in the buffer of FIG. 4.

FIG. 5 shows an adjustment to the buffering of FIG. 4 that may be made where past statistics show that users use multiple seek commands, and spend little time at any one seek point before requesting another seek. To adjust for this behavior, data is buffered at a larger number of forward seek points, but the amount of data stored at each seek point is decreased. It will be appreciated that once a seek operation is performed and playback jumps to the seek point, the seek point becomes the current playback point and overall buffering adjusts accordingly.

Figure 6:
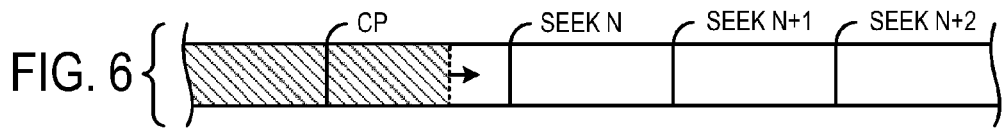
FIG. 6 shows a schematic depiction of another example of an adjustment of the buffering of streaming media data in the buffer of FIG. 4.

Next, FIG. 6 shows an adjustment to the buffering of FIG. 4 that may be made where past statistics show that users do not use the seek function. To adjust for this behavior, buffering of data at forward seek points may be stopped, thereby freeing up network resources for other uses (for example, streaming user interface information, increasing a bit rate of the media data stream, etc.).

Figure 7:
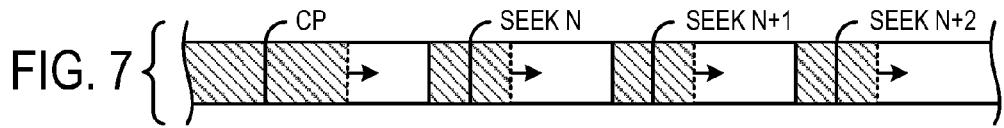
FIG. 7 shows a schematic depiction of another example of an adjustment of the buffering of streaming media data in the buffer of FIG. 4.

FIG. 7 shows an adjustment to the buffering of FIG. 4 that may be made where past statistics show that users request multiple seeks from a current playback position and also rewind from the seek points. To adjust for this behavior, data is stored beginning several seconds (or other amount of time) prior to each seek point, as well as for several seconds after each seek point. This may allow a user to jump forward to a seek point and then rewind from the seek point with little to no noticeable lag.

Figure 8:
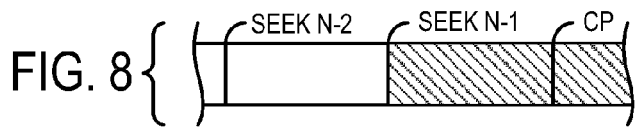
FIG. 8 shows a schematic depiction of an example of an adjustment of the flushing of data from the buffer of FIG. 4.
Figure 9:
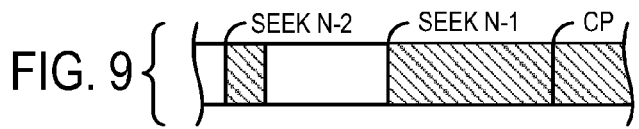
FIG. 9 shows a schematic depiction of another example of an adjustment of the flushing of data from the buffer of FIG. 4.

As described above, some media receivers may not have sufficient local storage to store an entire media stream. Therefore, the seek prediction and buffer management module 210 may also control the selective flushing of buffer data to optimize seek performance. FIGS. 8 and 9 show examples of different methods of flushing the buffer of FIG. 4. First regarding FIG. 8, if past statistics show that users generally only request a single backward seek from the current playback position, data extending back to the first seek point in the rewind direction may be stored. Likewise, if past statistics show that users request multiple backward seeks from a current playback location, then some data may be retained at two or more past seek points, as shown in FIG. 9. Further, data may be flushed from between these seek points, also as shown in FIG. 9.

Figure 10:
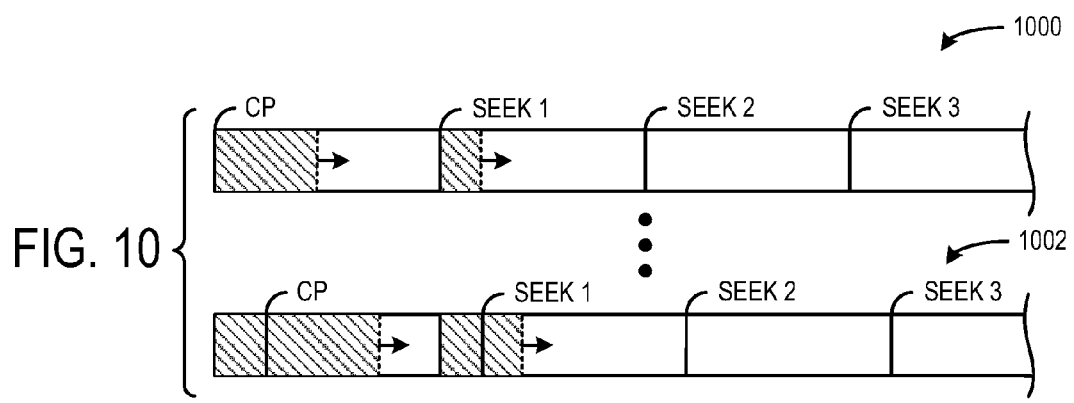
FIG. 10 shows a schematic depiction of another embodiment of a buffer containing streaming media data at first and second points in time.

Next, FIG. 10 shows a schematic depiction of a buffer containing buffered data at a current playback location and at one forward seek point, and also illustrates the accumulation of data in this buffer over a period of time. As described above, FIG. 10 depicts the buffering of data in which the seek points are located at fixed intervals from the current playback position, rather than at fixed times in the streaming media. The initial buffering of data before playback begins is shown at 1000 in FIG. 10, and the buffering of data after some playback has occurred is shown at 1002.

As shown in FIG. 10, as time progresses and as the seek point moves forward along with the current playback position, buffered data beginning at the initial location of the seek point is retained in the buffer, allowing rewind operations to be performed without lag from the seek point as the seek point moves forward with the current playback position. Further, once the data buffered associated with the current playback position reaches the previously buffered data associated with the first seek point, data at additional forward seek points may be buffered. Alternatively, data at forward seek points may be buffered at an earlier time.

Figure 11:
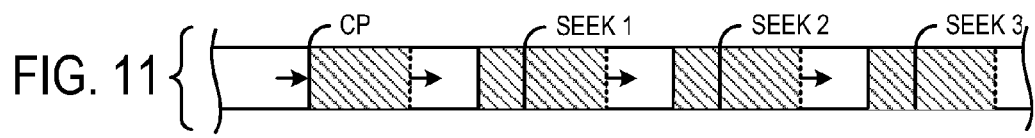
FIG. 11 shows a schematic depiction of an example of the buffering and flushing of data from the buffer of FIG. 10.

FIG. 11 shows an adjustment to the buffering of FIG. 10 that may be made where past statistics show that users request multiple forward seeks from the current playback position. To adjust for this behavior, information at more than one forward seek point may be buffered. Further, data that has already been played may be flushed from the buffer (as shown in FIG. 11), or may be retained to aid with backward seek requests.

Figure 12:
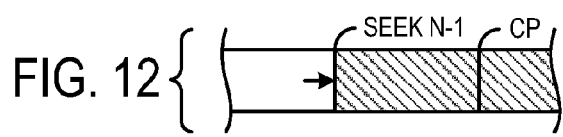
FIG. 12 shows a schematic depiction of another example of the flushing of data from the buffer of FIG. 10.
Figure 13:
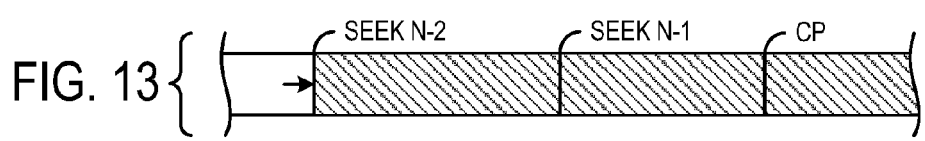
FIG. 13 shows a schematic depiction of another example of the flushing of data from the buffer of FIG. 10.

FIGS. 12 and 13 show examples of different methods of flushing the buffer of FIG. 10. First regarding FIG. 12, if past statistics show that users generally only request a single backward seek from the current playback position, data extending back to the first backward seek point may be stored, and older data flushed. Likewise, if past statistics show that users request multiple backward seeks from a current playback location, then some data may be retained at two backward seek points (as shown in FIG. 13), or at more past seek points.

It will be appreciated that, in some embodiments, data may be buffered at seek points in a non-predictive manner. In other words, media receivers 122, 126 may be configured to download and buffer content located at one or more preselected seek points without regard to past user seek behavior.

Further, while described herein in the context of a home streaming media environment, it will be appreciated that the concepts disclosed herein may be used in any suitable streaming media environment, including but not limited to other client-server-based use environments and peer-to-peer-based use environments. Furthermore, it will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a streaming media player, a method of buffering a stream of media data having one or more predefined seek points, comprising:
    buffering a first segment of the stream of media data streamed from a media server to the streaming media player, the first segment at a current playback location of the stream of media data presented by the media player; and
    prior to receiving a seek request from a user to skip to a seek point of the one or more predefined seek points, buffering a second segment of the stream of media data at the seek point separated from the first segment of the stream of media data by a segment of unbuffered data of the stream of media data.

2. The method of claim 1, wherein the seek point is located later in the stream of media data than the current playback location.

3. The method of claim 1, wherein the seek point is located earlier in the stream of media data than the current playback location.

4. The method of claim 1, wherein the stream of media data comprises a plurality of predefined seek points, and the method further comprises buffering a plurality of segments of the stream of media data each located at an associated seek point of the plurality of predefined seek points and each separated from buffered segments of the stream of media data at adjacent seek points by segments of unbuffered data of the stream of media data.

5. The method of claim 1, further comprising receiving a plurality of seek requests, and predictively adjusting the buffering of the stream of media data based upon one or more characteristics of the plurality of seek requests, characteristics of media content items corresponding to the stream of media data presented by the media player when the seek requests were made, and/or items of information stored in a user profile and/or content profile.

6. The method of claim 5, wherein the one or more characteristics of the plurality of seek requests comprises one or more of a frequency or number of seek requests made, a number of seek intervals ahead of or behind the current playback location that are requested, and an interval between seek requests.

7. The method of claim 5, wherein adjusting the buffering of the stream of media data comprises one or more of adjusting an amount of data that is buffered at seek points, adjusting an amount of data that is retained in a buffer after playback of the data has occurred, and adjusting a number of seek points at which data is buffered.

8. The method of claim 1, further comprising determining a network capacity before buffering the first segment of the stream of media data at the seek point, and adjusting the buffering of the stream of media data based upon the network capacity.

9. The method of claim 8, further comprising requesting a server providing the stream of media data to change a bit rate of at least a portion of the stream of media data based upon the network capacity.

10. In a streaming media player, a method of buffering a stream of media data having a plurality of predefined seek points, comprising:
    requesting a remote device to send media data at a current playback location of the stream of media data;
    receiving and buffering the media data at the current playback location;
    presenting media content corresponding to the media data at the current playback location;
    prior to receiving a seek request from a user to skip to a selected seek point of the plurality of predefined seek points, requesting the remote device to send media data at the selected seek point separated from the media data at the current playback location by a segment of unbuffered data of the stream of media data;
    receiving and buffering the media data at the selected seek point;
    receiving a plurality of seek requests via user inputs, each seek request requesting presentation of media content corresponding to media data at a seek point associated with that seek request; and
    adjusting the buffering of the stream of media data by the media player at one or more of the current playback location and the selected seek point based upon one or more characteristics of the plurality of seek requests.

11. The method of claim 10, wherein the one or more characteristics of the plurality of seek requests comprises one or more of a frequency or number of seek requests made, a number of seek intervals ahead of or behind the current playback location that are requested, an identity of a show during which the seek requests are made, a duration for which a user typically remains at one seek point before inputting another seek request, and one or more items of information stored in a user profile.

12. The method of claim 11, further comprising storing information related to the characteristics of the plurality of seek requests made during presentation of a specific media content item in a profile for that media content item.

13. The method of claim 10, wherein adjusting the buffering of the stream of media data comprises adjusting an amount of data that is buffered at predicted seek points.

14. The method of claim 10, wherein adjusting the buffering of the stream of media data comprises adjusting an amount of the media data that is retained in a buffer after playback of the media data has occurred.

15. The method of claim 10, wherein adjusting the buffering of the stream of media data comprises adjusting a number of seek points at which the media data is buffered.

16. The method of claim 10, further comprising receiving information from the remote device regarding a location of each of the plurality of predefined seek points in the stream of media data prior to requesting the remote device to send media data for buffering at the selected seek point.

17. A computing device, comprising:
instructions stored on the computing device, wherein the instructions are executable by the computing device to operate a media player, to request from a remote server over a network media data at a current playback location of a stream of media data having a plurality of predefined seek points separated from the media data at the current playback location by a segment of unbuffered data of the stream of media data, to receive the media data at the current playback location from the remote server, to buffer the media data at the current playback location and at one or more seek points, to present media content corresponding to the media data at the current playback location on the media player, to retain at least a portion of the media data at the current playback location in a buffer of the computing device after presentation of the media content by the computing device, to receive a plurality of seek requests via user input to the computing device, and to adjust buffering of the media data at the one or more of the plurality of predefined seek points based upon one or more characteristics of the plurality of seek requests received.

18. The computing device of claim 17, wherein the instructions are executable to adjust one or more of the buffering of the media data and flushing of buffered media data based upon one or more of a frequency or number of seek requests made, a number of seek intervals ahead of or behind the current playback location that are requested, and a duration for which a user typically remains at one seek point before requesting another seek.

19. The computing device of claim 18, wherein the instructions are executable to adjust the one or more of the buffering of the media data and the flushing of buffered media data by adjusting one or more of an amount of data that is buffered at seek points, an amount of data that is retained in a buffer after playback of the data has occurred, and a number of seek points at which data is buffered.

20. The computing device of claim 17, further comprising instructions executable to receive information regarding the location of the plurality of predefined seek points of the stream of media data from the remote server prior to receiving and buffering the media data at the one or more seek points.

* * * * *